Figure 1:
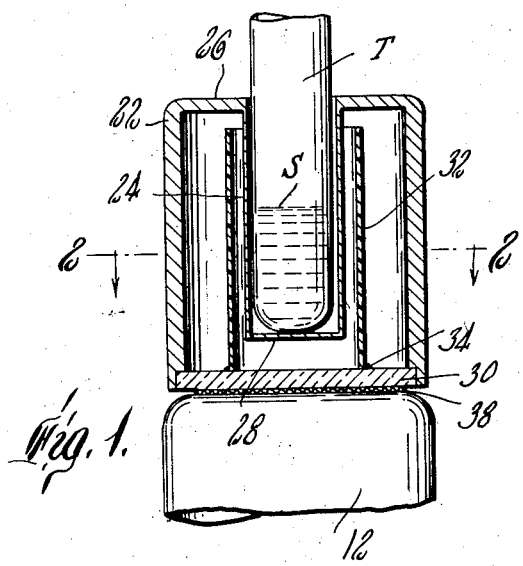

Oct. 7, 1958  H. F. STODDART ET AL  2,855,520

RADIATION DETECTOR

Filed July 3, 1956

2,855,520

RADIATION DETECTOR

Hugh F. Stoddart, South Sudbury, and James B. Williams, Lexington, Mass., assignors to Baird-Atomic, Inc., a corporation of Massachusetts Application July 3, 1956, Serial No. 595,681

6 Claims. (Cl. 250—71)

This invention relates to the measurement of beta radiation and, more particularly, to novel apparatus especially useful for measuring such radiation in the presence of gamma radiation.

In the analysis of chemical and biological material, the measurement of beta and/or gamma radiation emitted by the material to be analyzed has proved to be a most useful tool in providing rapid and accurate quantitative chemical analyses, particularly by the use of a so-called "well" structure employed with a scintillator for measuring the radiation of such material with a minimum of sample preparation.

In practice, gamma radiation can be measured by means of the well known NaI(T1) gamma well structure in the presence of beta radiation by preferentially absorbing the less penetrating beta radiation and then measuring the remaining gamma radiation which is but slightly attenuated by the beta radiation absorption medium. Also, the quantitative measurement of beta radiation by itself by such a well is relatively simple. However, the presence of gamma radiation makes difficult, and, in many cases, impossible, any evaluation in a NaI(T1) well structure of the amount of beta radiation present, since the interfering gamma radiation cannot be absorbed without absorbing the beta radiation as well.

According to the present invention, a novel apparatus is provided which, for the first time, makes possible the measurement of beta radiation in the presence of gamma radiation by means of a well type of structure with its great ease of sample preparation. As an example, consider the quantitative detection of potassium ($K^{42}$) in presence of sodium ($Na^{24}$), the isotope radiation being as follows:

|  | Beta | Gamma |
| --- | --- | --- |
| $K^{42}$ | 2.04 m. e. v. (25%); 3.58 m. e. v. (75%) | 1.5 m. e. v. (25%). |
| $Na^{24}$ | 1.4 m. e. v. (~100%) | 1.37 m. e. v. (~100%). 2.75 m. e. v. (~100%). |

First, it should be noted that the sodium ($Na^{24}$) can be preferentially measured in the presence of potassium ($K^{42}$) by the absorption of all beta radiation and the attenuation of the weaker gamma rays. Thus, the radiation of sodium ($Na^{24}$) is readily detected in the presence of that of potassium ($K^{42}$) by preferentially absorbing all of the beta radiation of both elements and the gamma radiation of 1.5 m. e. v. and less, leaving only the 2.75 m. e. v. gamma radiation, which is characteristic only of sodium ($Na^{24}$).

However, the above approach is not possible for the quantitative measurement of potassium in the presence of sodium, since preferential absorption of the beta radiation and any portion of the gamma radiation obviously cannot serve to detect the presence of potassium ($K^{42}$), because the highest energy gamma radiation is that of sodium ($Na^{24}$) at 2.75 m. e. v We have discovered, nevertheless, that the beta radiation can be detected in the presence of gamma radiation by, in effect, using a "well" type of detector essentially insensitive to gamma radiation but sensitive to beta radiation. This can be accomplished by the use of scintillation apparatus of the type having a light emitting scintillator and photosensitive detector therefor by using therein a sufficiently thin scintillator so that gamma radiation will be transmitted through such crystal with minimum interaction, while a substantial proportion of the beta radiation will activate the scintillator. The thickness of such scintillator is quite critical and, using an organic containing plastic scintillator of tubular form, we have found that such scintillator must have a wall thickness of between 0.015 and 0.150 and preferably 0.020 to 0.050 inch.

Furthermore, since high energy gamma radiation interactions result in secondary electrons indistinguishable from beta particles, it is necesary that there be used in any structure in the vicinity of the scintillator and particularly between the source of radiation and the scintillator, relatively thin, low atomic number, low density materials, such as for example, aluminum or magnesium, to reduce such gamma interactions and, in effect, provide together with the scintillator, a structure essentially transparent to gamma radiation.

Too, from practical considerations, it is desirable to have an apparatus which is able to measure the radiation of materials in solution, as contained for example, in a test tube, thus to take advantage of the ease of sample preparation inherent in the "well" type of structure. This requirement, however, raises further problems as to absorption of beta radiation and efficient transmisison of light emitted by the scintillator to the photosensitive detector, which our novel apparatus effectively solves by its "well" configuration with highly reflective interior surfaces spaced from the scintillator, and by the use of roughened surfaces on the scintillator.

Figure 2:
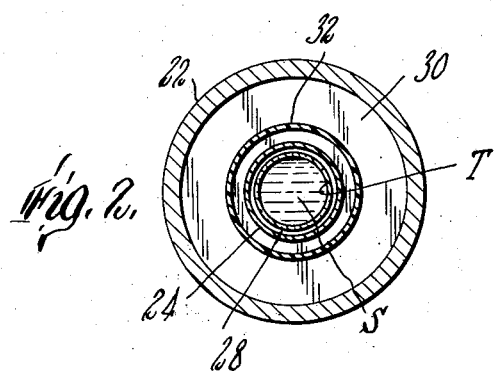

For the purpose of further explaining the invention, reference is now made to the following description, together with the accompanying drawings, in which:

Fig. 1 shows a cross-sectional view of the preferred embodiment of the invention; and Fig. 2 shows a cross-sectional view taken on the line 2—2 of Fig. 1.

As shown in the drawing, our novel apparatus is generally of the well type employing scintillation detection, such structure being arranged to receive a test tube T having therein a solution S containing the chemical or biological material to be quantitatively analyzed. A conventional photomultiplier tube 12 with entirely conventional circuitry, such as that shown, for example, in Coltman et al. Patent No. 2,550,106 may be employed for detecting the light output from our novel structure.

According to the present invention, the apparatus comprises a housing member preferably of aluminum or magnesium having an outer cylindrical wall 22 and an inner cylindrical well wall 24 generally concentric therewith, the inner wall being connected to the outer wall by an annular end wall 26 extending therebetween at one end thereof. The inner well wall 24 has at its opposite end spaced somewhat inwardly from the opposite end of outer wall 22 and end closure 28 to provide a light-tight well structure into which the test tube T may be inserted. The lower open end of the housing has mounted therein a circular glass plate 30 having mounted on its upper face in concentric relationship with walls 22 and 24 and spaced therebetween, a thin-walled tubular scintillator 32, said scintillator being mounted at its one end on said plate as by suitable cement 34 and extending to just short of annular end wall 26. The glass plate 30 at the lower end of the apparatus is positioned immediately adjacent the end face of photomultiplier tube 12, preferably with a suitable optical coupling medium 38 interposed therebetween and provides a light-tight assembly therewith.

In order to provide a structure essentially transparent to gamma radiation, yet one which will detect the beta radiation from the solution S in test tube T, the well wall 24 must be sufficiently thin to reduce high energy gamma interactions to a negligible amount. This can be accomplished by the use of a low density, low atomic number material such as aluminum or magnesium of about 0.005 inch thickness or less. Also, to aid in complete transmission to photomultiplier tube 12 of the light emitted by scintillator 32, the opposing interior surfaces of the inner and outer walls 24 and 22, respectively, as well as that of end wall 26 must be highly polished or otherwise made suitably reflective as by coating them with the oxides as of magnesium, or titanium or aluminum. By so facilitating the transmission of light from the scintillator 32 downwardly toward the photomultiplier tube 12, a true measure of the amount of beta radiation detected by scintillator 32 is provided.

The scintillator itself must be sufficiently transparent to gamma radiation so that the scintillations produced by gamma radiation alone is negligible and yet it must produce scintillations corresponding to substantially all of the beta radiation which traverses it from solution S. This is accomplished by the use of a thin-walled tubular scintillator of the plastic organic containing type spaced away from both of the walls 22 and 24, the scintillator itself preferably having a wall thickness of 0.020–0.050 inch. Also, to facilitate both the escape of light from the scintillator 32 and to prevent its reabsorption as much as possible, the crystal 32 is rough-surfaced as by 200–500 abrasive.

With the arrangement of a rough-surfaced scintillator 32 mounted within and spaced from the highly reflective walls 22, 24 and 26, substantially all of the light generated in said scintillator by the beta radiation is transmitted downwardly toward the open end of the structure through glass plate 30 and into photomultiplier tube 12, such glass plate having suitable optical characteristics, particularly that of transmission at the blue end of the spectrum, and with suitable optical coupling 38, such as Dow Corning 200 fluid, provided to aid in the transmission into photomultiplier tube 12 of all the emitted light.

The organic containing plastic material of the scintillator 32 is well known in the art, being manufactured, for example, by the Pilot Chemical Co., Waltham, Mass.; Larco Instrument Co., Palisades, N. J.; National Radiac Co., Newark, N. J.; Nuclear Enterprises, Ltd., Winnipeg, Canada, and also being described in Curran, Luminescence and the Scintillation Counter; and Birks, Scintillation Counting, and hence, need not herein be further described.

Thus, it will be seen that the invention provides novel apparatus for measuring beta radiation in the presence of gamma radiation and hence, makes possible quantitative analyses under conditions not heretofore thought possible. Various modifications of the invention employing therein scintillators suitably sensitive to beta radiation and together with associated structures essentially transparent to gamma radiation within the spirit of the invention and the scope of the appended claims will occur to those skilled in the art.

We claim:

1. Apparatus for detecting beta radiation in the presence of gamma radiation comprising a housing member including inner and outer walls connected at their one end by a transverse wall and having an opening at their opposite end, said walls having highly reflective inner surfaces with said inner wall being substantially transparent to gamma radiation, a thin-walled tubular scintillator essentially transparent to gamma radiation and substantially sensitive to beta radiation interposed between said walls concentrically thereto and means adjacent said housing opening for detecting light emitted by said scintillator and reflected by said walls.

2. Apparatus as claimed in claim 1 wherein said scintillator includes an organic containing plastic.

3. Apparatus as claimed in claim 2 wherein said scintillator has a wall thickness of between about 0.015 to 0.150 inch.

4. Apparatus as claimed in claim 2 wherein said scintillator has a roughened surface.

5. Apparatus as claimed in claim 1 wherein said inner wall is of a low density and low atomic number material.

6. Apparatus for detecting beta radiation in the presence of gamma radiation comprising a well housing member including light-tight inner and outer cylindrical wall members connected at their upper end by a transverse wall, with said inner cylindrical member stopping short of said outer member and having a light-tight bottom closure, said housing being substantially open to light at its lower end, and being of a low density material of the class comprising aluminum and magnesium with highly reflective interior opposing wall surfaces, and said inner wall being of a thickness of about 0.005 inch substantially transparent to gamma radiation, a tubular scintillator having a wall thickness of about 0.020 to 0.050 inch, essentially transparent to gamma radiation and substantially sensitive to beta radiation, interposed between said inner and outer walls concentrically thereto and spaced therefrom and stopping short of said transverse wall, means including a light transparent plate mounted adjacent the lower end of said outer wall and supporting said scintillator, and light detecting means positioned adjacent said light transparent plate for detecting light emitted by said scintillator due to beta radiation.

References Cited in the file of this patent

Liquid Scintillation Beta Counter for Radioactive Solids, by Bluh et al., Nucleonics, September 1952, pp. 48–51.

Simplified Beta Counting, by Loeving et al., Nucleonics, April 1955, pp. 43–45.

Thin Scintillators of Zns in Fused $B_2O_3$ for Thermal Neutron Detection by Gunst, et al., Review of Scientific Instruments, September 1955, pp. 894–895.

Portable Instruments for Beta-Ray Dosimetry, by Roesch et al., a paper submitted to the Geneva Conference in August 1955, copy in Peaceful Uses of Atomic Energy, vol. 14, pp. 172–175, a United Nations Publication 1956.